(12) United States Patent
Hooley

(10) Patent No.: US 6,309,106 B1
(45) Date of Patent: Oct. 30, 2001

(54) MOTORS, AND BEARINGS THEREFOR

(75) Inventor: Anthony Hooley, Cambridge (GB)

(73) Assignee: 1... Limited, Cambridge (GB)

( * ) Notice: Subject to any disclaimer, the term of this patent is extended or adjusted under 35 U.S.C. 154(b) by 0 days.

(21) Appl. No.: 09/367,114

(22) PCT Filed: Feb. 9, 1998

(86) PCT No.: PCT/GB98/00390

§ 371 Date: Aug. 10, 1999

§ 102(e) Date: Aug. 10, 1999

(87) PCT Pub. No.: WO98/35165

PCT Pub. Date: Aug. 13, 1998

(30) Foreign Application Priority Data

Feb. 11, 1997 (GB) .................................................. 9702750
May 7, 1997 (GB) .................................................. 9709129
Sep. 5, 1997 (GB) .................................................. 9718785

(51) Int. Cl.$^7$ .................................................. F16C 29/00
(52) U.S. Cl. ..................... 384/7; 384/37; 384/42
(58) Field of Search .................. 384/7, 10, 12, 384/25, 26, 37, 38, 42

(56) References Cited

U.S. PATENT DOCUMENTS

| | | | |
|---|---|---|---|
| 3,060,754 | 10/1962 | Klingler | ............... 74/18.2 |
| 3,435,733 | 4/1969 | Enke | ............... 92/97 |
| 3,614,179 | * 10/1971 | Hosken | ............... 384/56 |
| 3,983,337 | * 9/1976 | Babb | ............... 381/407 |
| 4,024,770 | 5/1977 | Liesenborghs | ............... 74/18.2 |
| 4,115,667 | * 9/1978 | Babb | ............... 381/407 |
| 5,051,000 | * 9/1991 | Cadwallader et al. | ............... 384/7 |

FOREIGN PATENT DOCUMENTS

| | | | |
|---|---|---|---|
| 532082 | * 1/1958 | (BE) | .................. 384/59 |
| 195 46 113 | 7/1997 | (DE) | . |
| 0218937 A2 | 4/1987 | (EP) | . |
| 0218937 B1 | 4/1991 | (EP) | . |
| 4370413 | * 12/1992 | (JP) | .................. 384/26 |

* cited by examiner

*Primary Examiner*—Thomas R. Hannon
(74) *Attorney, Agent, or Firm*—Synnestvedt & Lechner LLP

(57) ABSTRACT

A linear motor comprising a linearly-extensive stator (1) supporting a translator (2), the stator providing in operation a squeezing force across the translator in a direction approximately orthogonal to the line of the stator, and the translator either having along its movement direction a slightly tapered profile or being mounted on the stator by force-transmitting bearings (3) that when so squeezed deform to become slightly tapered, the effect being to produce a resultant force on the translator that is along the line of the stator. The utilisation of a resilient toroidal bearing member (103) fitted inside and co-axially with a tubular passageway (108) in an outer, sleeve-like bearing body (101) through which an inner bearing body (102) is free to slide. The inner body is then fitted through the toroid, all three components thus being co-axially aligned. The resultant bearing can be of extremely low mass, of very low cost, and with strong radial alignment (centering) force, very low resistance to axial motion, almost unlimited movement in the axial direction.

11 Claims, 8 Drawing Sheets

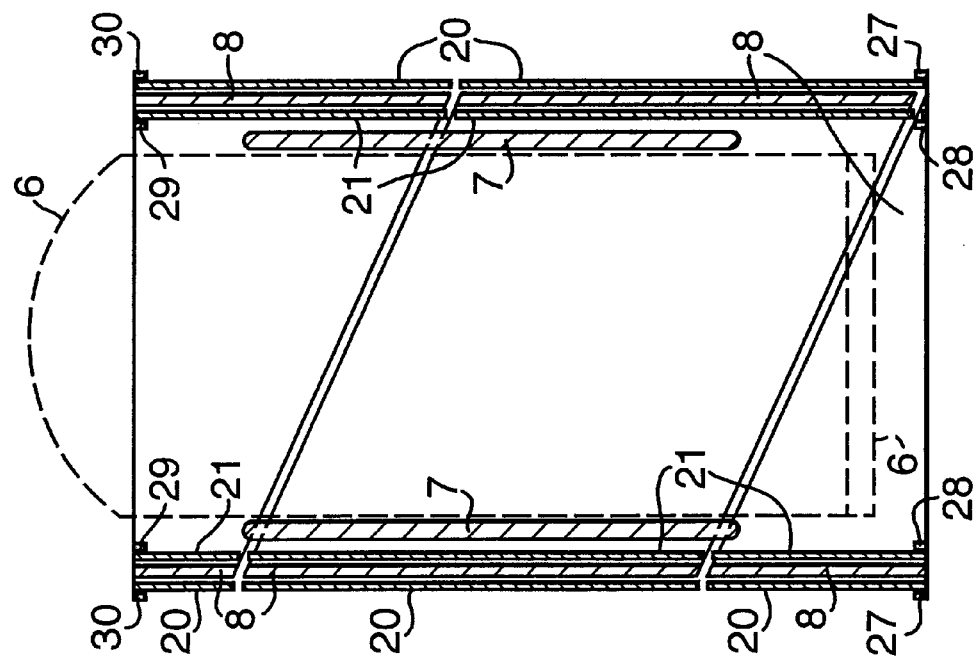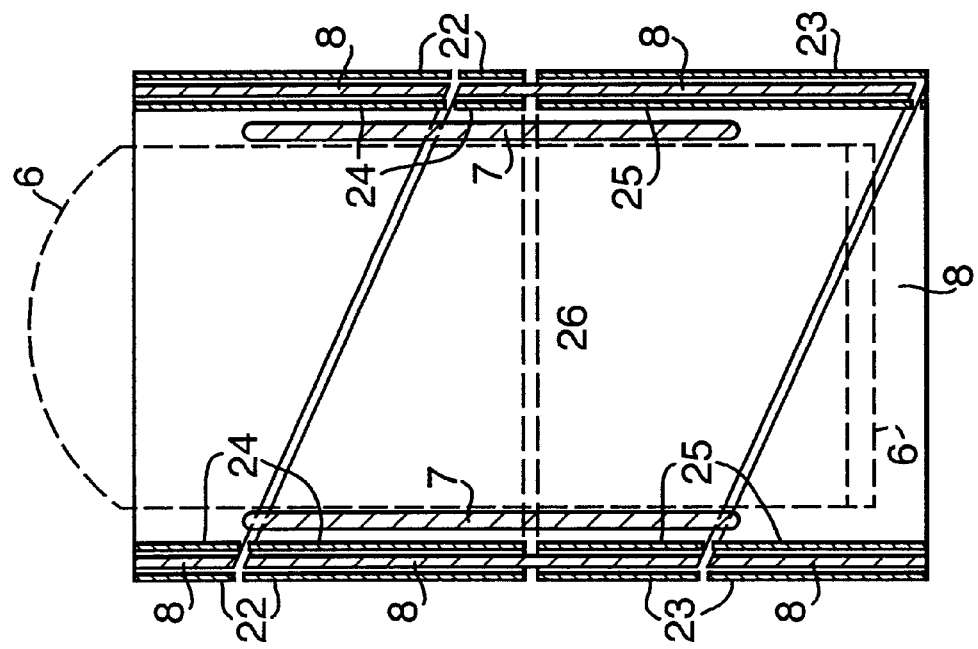

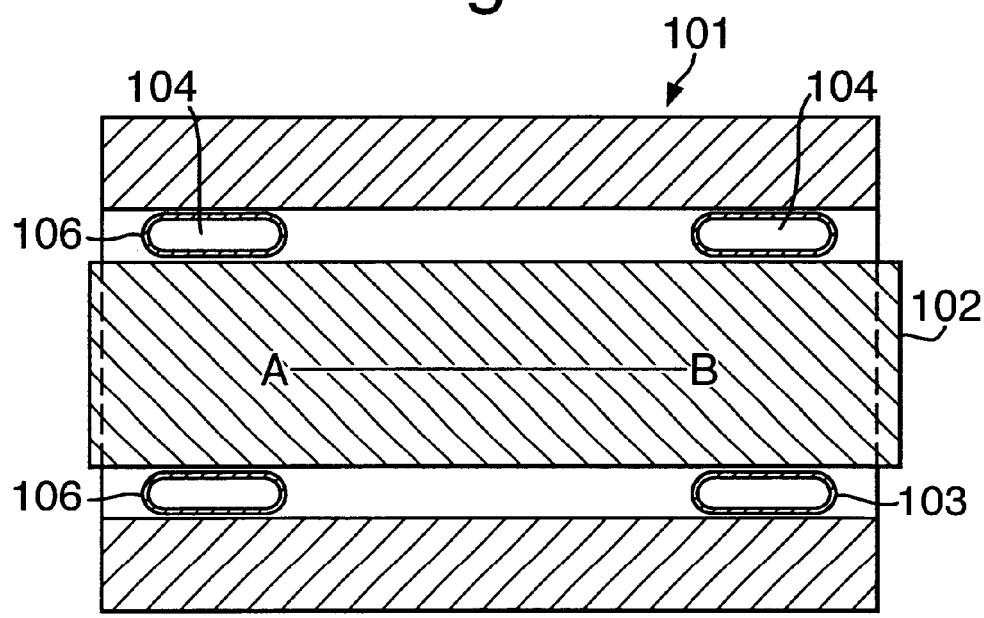
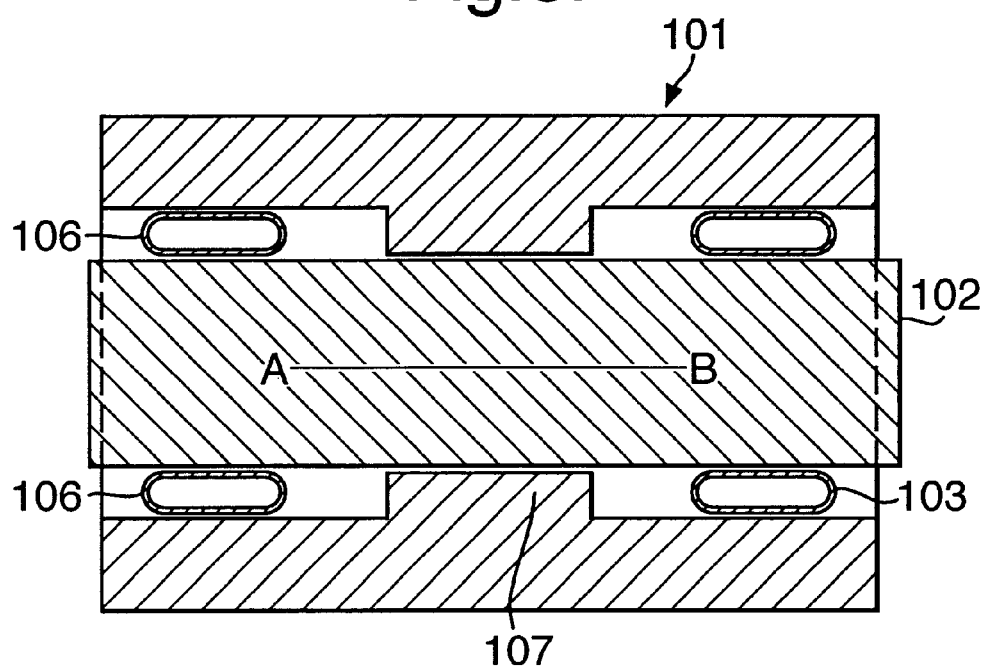

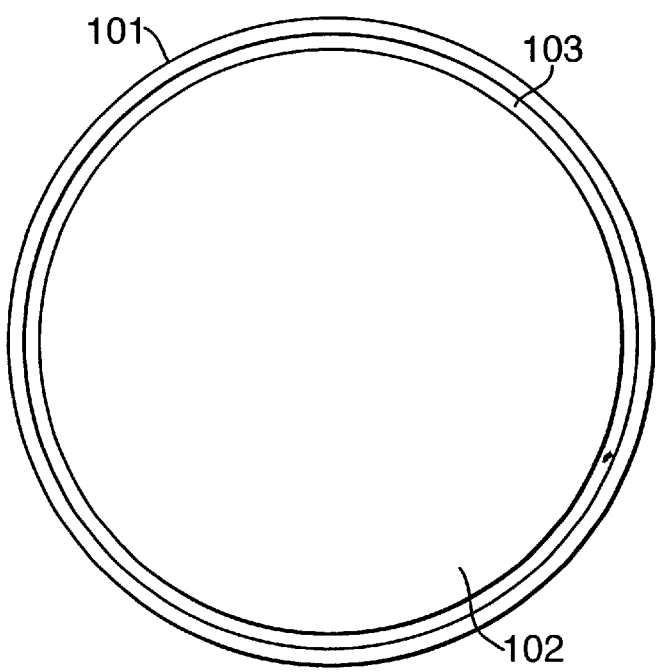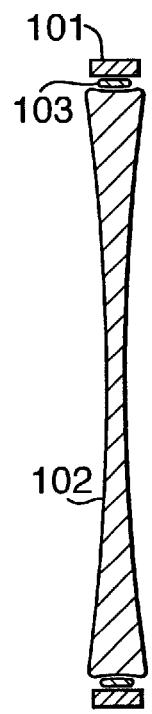
Fig.9A.
Fig.9B.

MOTORS, AND BEARINGS THEREFOR

In one aspect this invention is concerned with motors, and relates in particular to novel varieties of linear motor and the mechanism for driving them. In a second aspect the invention relates to bearings—that is to say, devices for providing relatively frictionless support of one object as it moves relative to the surface of another which supports it or with which it is in contact—which bearings are of use in the motors of the invention. In its second aspect the invention relates in particular to linear bearings, and also optionally combines this function with a selectable force/distance law spring effect.

MOTORS

The term "linear motor" is usually employed to describe a variety of electric motor. In a common type of conventional electric motor a rotating electromagnetic field is produced by a set of stationary coils (known as the stator) arranged to form a circle or cylinder, and this field interacts with a rotatably-mounted magnet or electromagnet (known as the rotor) mounted within the circle or cylinder of the stator, to drive the rotor round. In a linear motor, however, the stator coils are arranged in a line, and the field they produce advances along that line driving the "rotor"—in this case better described as a "translator"—along with it. Such a linear motor can be visualised as a conventional rotary motor the stator of which has been opened out and spread flat.

There are many other devices which produce propulsive force in a straight line rather than in a circle, and thus that might technically be considered as "linear" motors. Thus, steam, gas-driven, internal combustion, hydraulic and pneumatic reciprocating piston/cylinder engines are all non-electrical devices which fall into this category, while other electronic, electrical, electromagnetic devices are voice-coil motors, piezo-electric actuators, and some magnetostrictive devices (these last two have very short translator travel, measured in microns). Some types of linear motor—the so-called "inch-worm" motors—use regions of physico-mechanical compression and expansion in the stator to push the translator along at the speed of propagation of those regions.

There are applications where very high speed, low force, long travel, high linearity and very low moving mass are required, but none of the known linear motors have all of these capabilities. This is a problem the present invention addresses, seeking to provide a linear motor that will enable long-travel high-linearity motion in either a straight or a curved line at very high speed with extremely small translator mass, and yet which is extremely simple in concept and can be manufactured from a very small number of components. To achieve this, the invention proposes the use of a mechanism that applies motive, displacing force not primarily in the direction along which translator movement is desired but instead approximately at right angles to that direction, the construction of the mechanism being such that the consequence is that there is a resultant force—a resolved component of the applied motive force—that is directed along the desired line of movement of the translator, and thus the translator is "squeezed" out in the required direction rather in the way that a cherry pip or plum stone can be shot out by being squeezed between finger and thumb. Another analogy would be trying to pick up a wet (and thus very slippery) curved-outline piece of soap with the palm of a wet hand (the harder the soap is "gripped" the faster it shoots out away approximately at right angles to the direction of grasp). In this latter case the "gripping" hand is nominally stationary (it is the stator) and provides the motive power, whilst the soap plays the part of the moving part or "translator".

In one aspect, therefore, the invention provides a linear motor comprising a linearly-extensive stator supporting a translator in such a manner that the translator is able easily to move along the line, or axis, of the stator, and wherein:

the stator provides in operation a squeezing force across the translator in a direction approximately orthogonal to the line of the stator; and either the translator has along its movement direction a profile (either intrinsically or when so squeezed by the stator) that is slightly tapered, or the translator is mounted on the stator by force-transmitting bearings that when so squeezed by the stator deform to become slightly tapered along the line of the stator, such that in either case the effect of the squeezing is to produce a resultant force on the translator that is approximately orthogonal to the squeezing force, and thus along the line of the stator.

The linear motor of the invention comprises a linearly-extensive stator supporting a translator. The stator is linear in that it extends in a line rather than being arranged in a circle as in the case in most conventional electric motors. However, the line of the stator need not be straight—though most likely it is—but can be curved in several places and in one or two dimensions.

The stator may be of almost any type, shape and size, applying the squeezing force in any way thought appropriate. Basically, though, the stator is so constructed as to allow deformation of. the bearing aperture within it from a nominally cylindrical internal outline to a nominally truncated conical form, it being possible to reverse which end of the aperture has the smaller internal diameter. This may be achieved in a multiplicity of ways, including:

using a piezoelectric material for the stator, applying suitable electrode patterns, and driving those electrodes from an electrical supply;

making the stator from magnetostrictive material, and applying appropriate magnetic fields, for example by the provision of currents through suitably positioned adjacent conductors;

constructing the stator as a hollow shell-form object made of elastic material, this stator being divided into two (or more) internal chambers by one or more partitions, wherein the separate chambers so formed are driven with differing hydraulic or pneumatic fluid pressure supplies;

making the stator from a material with an appreciable thermal coefficient of expansion (at least in the circumferential direction around the bearing aperture), and driving it thermally (e.g. by hot fluids, by electrical resistance heating, or by direct conduction from one or more heat sources) so that one end of the aperture expands more than the other (such an arrangement might, for example, be used to control a thermostatic control valve, where the thermal sources included one or more of the hot fluid supply, the cold fluid supply and the exit fluid);

making a variant of the just-mentioned thermally-activated stator wherein a shape-memory alloy is used to produce the differential aperture diameter by application of thermal control sources;

building the stator to incorporate a bio-structure material capable of contraction or expansion (e.g. muscle tissue) so arranged around the interior of the aperture, and so stimulated by external control signals, that the desired conical deformations ensue.

However, the variety of stator presently thought most convenient and useful is that made of a piezoelectric material driven by suitably-applied electrical voltages.

In the invention's linear motor the stator supports a translator. In this context a "translator" is simply a component that can be driven along the stator by the applied force so as to perform some desired operation. Examples of stators, as defined by what they are required to do, include:

a rod coupled to an external mechanism to provide useful mechanical movement therein;

a light self-contained radially-stiff piston effectively sealed against fluid flow within the stator (perhaps by the bearing structure) which acts directly on the air surrounding it, to act as an acoustic transducer;

a self-contained radially stiff piston effectively sealed against fluid flow within the stator (perhaps by the bearing structure) fluid-coupled to one or more external chambers so as to act as a pump in conjunction with fluid flow control valves;

a self-contained radially-stiff piston carrying one or more mirrors or mirror surfaces to act as a focusing or deflection component in an optical system;

a self-contained massive radially-stiff piston whose inertia, mechanically coupled to the bearing stator via the bearing member and thence to its supporting structure, is used to apply or dampen vibration to that structure.

The translator, whatever its detailed form, will normally (but not always) have length—that is, a significant size—in a direction along the intended line of movement, so that it necessarily has a front end and a rear end. This, as is explained hereinafter, is relevant to the manner in which the stator's squeezing forces can be applied.

The translator may be made as a very low mass item, the only requirement for adequate operation of the motor mechanism being that it can provide radial reaction to the squeezing forces of the stator (it is not required to remain totally rigid; indeed, some degree of deformability may be preferred, as noted below). In practice its nominal (undeformed) shape may be somewhat like a barrel, or alternatively it may be basically parallel-sided (parallel to the axis of the motor) but taking on a tapered form only when deformed under the influence of the squeezing forces applied by the stator. When used as an audio transducer the translator is to be coupled only to the surrounding air, and the constraints on its structure are further reduced; in order to provide the high accelerations required, minimal mass is the principal criterion (along with imperviousness to air). Very low mass translators for this purpose may be produced from expanded foamed plastic, thin-walled shells of expanded foam plastic (possibly with the addition of very thin high-tensile surface skins of metal or other material) or a silica (or other) aerogel. Another alternative for a translator for audio transducers is to inflate with pressurized gas a very thin-walled high-tensile cylinder of plastic or metal to achieve the desired radial stiffness with very low mass (similar to a pressurised thin-walled coke-can or plastic carbonated mineral-water bottle, where in both cases the stiffness produced is due principally to the tension in the container walls as a result of internal gas pressure).

As noted, the stator is linearly-extensive, and the translator moves along the line thereof. As already hinted, the geometry of the stator/translator combination, however, can take a number of different forms. Thus, in one case the stator can partly or wholly surround the translator (except along the axis of motion, of course), taking for instance the form either of a pair of opposed nearly-parallel plates (the stator) on either side of a slightly tapered rectangular block translator, or alternatively of a tubular stator disposed around and co-axial with a cylindrical (or perhaps slightly barrelled) translator. In what might seem to be almost an opposite construction—a similar geometry, but inside-out—the stator can be a cylinder inside a (possibly slightly waisted) tubular translator. The cylindrical and tubular components do not have to have cylindrical symmetry—they need not be circular in cross-section—however; square-section (or other section) stators and rotors are quite possible and useful in certain circumstances.

The invention's stator supports the translator in such a manner that the translator is able easily to move therealong. This support could take many different forms. At one extreme, for instance, it could be merely two flat surfaces sliding one across the other, perhaps with the assistance of some friction-reducing lubricating agent such as air, grease, oil, wax, or PTFE. At another extreme it might be an air gap and a maglev field—two opposing magnetic fields, at least one probably electrically generated, keeping the stator and translator apart against the forces trying to bring them together. A preferred form of support, though, is one or more bearing members—ball bearings (especially re-circulating ball bearings), roller bearings, needle bearings and so on—arranged to allow the translator to move along the stator with minimal friction. However, for applications requiring very high accelerations and therefore minimal moving mass (e.g. audio transducers) a particularly useful form of bearing member is that linear bearing device described hereinafter. Such a bearing member, which is basically a very flexible and deformable inflatable annulus, much like a rubber tyre inner tube, provides near-zero friction (all surfaces roll) with very small mass, transmits radial forces well, and has the added advantages (for audio transducer purposes) of producing almost zero bearing noise, and forming a near perfect air-tight seal between the moving parts (i.e. between the stator and translator).

In the linear motor of the invention the stator provides in operation a squeezing force across the translator in a direction approximately orthogonal (at right angles) to the line of the stator. Thus, the squeezing force is in a direction approximately orthogonal to the intended line of movement of the translator. As a general comment here, it is perhaps worth repeating that the idea is to push the translator along in much the same way that a cherry pip held between finger and thumb can be fired out—"explosively", perhaps—by squeezing it, the main squeezing forces being not in the direction the pip is to go but instead nearly at right angles—orthogonal—thereto, the deformation of the fingers and the tapered/rounded shape of the pip combining, however, to produce a significant resultant force along the intended line of flight.

The squeezing force somehow resulting in a force component along the line of the stator to make the translator move therealong. This formation of a stator-aligned force component is caused either because the translator has along it in its movement direction a profile (either intrinsically or when so squeezed by the stator) that is slightly tapered, or because the translator is mounted on the stator by force-transmitting bearing members that when so squeezed by the stator themselves deform to become slightly tapered. This is now explained further.

The squeezing force may be produced in any convenient way, and this may involve concomitant physico-mechanical deformation of the stator itself. Consider merely the concept, and with a device wherein the stator is "outside" the translator (with the stator "inside" the translator the effects will be suitably reversed). If the stator mechanically constricts against and behind one end of the translator (while possibly expanding correspondingly away from and beyond the other end), like a finger and thumb on a cherry pip, and particularly where the translator is deliberately shaped—tapered, perhaps—to be narrower at that end than at the other end (as the pip is), then as a result the applied squeezing force will have a component along the line of the stator such that the "constriction" end of the translator becomes the rear end, the expansion end becomes the front end, and the translator moves off to the front. A simple alternative to using a pre-shaped translator is to have one which itself deforms non-uniformly under the applied squeezing force; again the result is a force component along the line of the stator, from the (rear) relatively deformed end to the (front) relatively undeformed end, driving the translator along. In one preferred possibility both these are utilised—that is, the stator mechanically constricts and the translator deforms. A further possibility arises when there is used as the bearing member one of those linear bearing devices described hereinafter: in such a case, the translator may retain an effectively parallel-sided form even when squeezed, it being the bearing member itself that deforms to cause the generation of the required force component along the line of the motor.

Where a particular application of the linear motor of the invention produces axial load forces on the translator which vary in a predictable manner with translator position, it is possible to tailor the axial force output of the motor as a function of the axial position of the translator to counteract this variable loading. This can be achieved by suitable tailoring of the geometry of the stator and its deformation characteristics with respect to some motor-actuating input drive signal, so as to maintain linearity of operation.

The stator's squeezing produces a resultant force on the translator along the latter's intended line of movement. The mechanical advantage obtained here is governed by the geometry of the stator and translator, and can easily be made as large as desired (by the use, for instance, of a very shallow taper on the translator) if low-translator-force high-displacement performance is required. In such high-mechanical-advantage versions the maximum driven displacement of the translator is governed by the length of the stator, not by the length of the translator, and not by the maximum orthogonal displacement of the stator.

The mechanical advantage allows the use of inherently small-displacement motive power mechanisms, and significant movement of the translator may be obtained in particular for even the very small stator movements obtainable from stators made from (and utilising the properties of) piezo-electric and magnetostrictive material. In particular, for example, if the stator is made from a thin cylinder of piezo-electric material with inside and outside metallizations acting as the electrical input contact points, then applying a voltage will cause the material to shrink or expand, and thus will cause the whole cylinder to contract or expand in radius slightly. If, moreover, the metallization on both inner and outer surfaces is divided into two equal areas, along inner and outer circumferential lines halfway along the axis of the cylinder, and the inside of one end is connected to the outside of the other end, and vice-versa, then the application of an input voltage will now cause one end of the cylinder to increase in radius and the other end to decrease. Conversely, reversing the input voltage will cause the alternate ends of the cylinder to expand and contract. A zero input voltage will leave the cylinder parallel-sided along its length. This provides the desired stator cylinder deformation necessary to apply controllable drive forces to the translator in either direction.

Similar effects can be achieved using not conductive metallic layer electrodes on the inside and outside of the thin-cylinder stator but instead resistive layer electrodes such that a voltage applied across each layer from one end to the other of the stator will gradually fall off along the layer and so will exert the same sort of differential contraction/expansion effect as attained using a half-way-cut conductive layer. The resistivity of the electrode material is chosen such that the end-to-end resistance of each electrode (i.e. from one end of the stator to the other) is high enough that wherein full drive voltage is applied across these positions the power dissipated in the resistance is acceptable, but which resistivity is chosen to be low enough that the time taken to charge the self-capacitance of the piezoelectric bender through the resistive electrode is adequately short to meet the desired bandwidth service requirements of the stator. In such a resistive version the applied voltage is supplied to each end of each (inner and outer) surface via proper, conductive electrodes each in the form of a ring of negligible axial length deposited around the surface, thus connecting to the axial ends of the resistive electrode coatings; the inner ring electrode at the one end is connected to the outer ring electrode at the other, and the outer ring electrode at the one end is connected to the inner ring electrode at the other, and then the drive voltage is connected across the two electrode rings at one or the other end of the stator. The effect is that the drive voltage potential difference is uniformly distributed along the lengths of the inner and outer resistive electrodes, but in opposite directions, so that close to the centre of the stator the electric field across the thickness of the stator material is negligible, and rises to a maximum at both ends but with the fields at each end having opposite polarities. The resultant stresses produced in the piezoelectric are such as to deform the stator into a conical shape with one end having maximum radius, the other minimum radius, and the radius at all points between varying smoothly and approximately linearly between these states. Reversal of the drive voltage will cause the end that had maximum radius to then have minimum radius, and vice versa, the centre section of the stator still having negligible electric field and thus negligible deformation from its undriven shape.

In the examples just described, the amount of expansion and contraction of the piezo-electric stator is limited by the direct piezo-electric effect. However, for both the metallised and the resistive coating versions a considerably increased expansion/contraction can be achieved if the stator is made as a standard unimorph or bimorph 'piezo-bender' configuration device. Thus, using the same geometry and electrode layout but with, in addition, for (for example) the metallised variety, first a stiff metal liner is provided on either the inside or outside of the piezo-electric cylinder, and secondly a helical cut through the cylinder is made (such that what remains is a helical 'tape' of piezo-electric/metal laminate material with a small gap between turns). In this simple way the device has been transformed into a unimorph 'piezo-bender' configuration (albeit wrapped into a helical form), whereupon the cylinder radial displacement for a given applied input voltage will be very much increased because the piezo/metal laminate will bend due to the differential expansion of the two bonded materials. Such a helical split-bender can provide tens or even hundreds of microns of end-to-end differential radial displacement for low applied input voltages. The technique can be improved even further, by replacing the metal liner with a piezo-electric material of opposite polarity to the original piezo-electric cylinder, and so providing a classic bimorph 'bender' configuration with a very high displacement output for a given input voltage.

The resistive version is made in much the same way, save that it is of course not cut electrically into halves at the middle of the stator.

The second layer of the bimorph bender can be made by suitable chemical surface-treatment (usually chemically reducing) of the relevant surface of the basic piezo-electric material of the cylinder (as is currently done to manufacture certain high-output benders) instead of applying a separate metal or opposed-polarity piezo-electric layer.

As can be seen from the foregoing, a linear motor according to the invention has three basic components, namely a stator which provides a 'squeezing' force, a translator that is squeezed by the stator, and so moves, and a bearing member of some kind interspersed between the stator and translator. The mechanism has the following potential advantages:

a) The power source—the source of the force to be applied to the translator—can be entirely incorporated in the stator and whatever mechanism is used to produce the 'squeezing' force, so effectively adding no mass to the moving parts of the motor (this allows the use of relatively heavy motor parts as force producers without incurring dynamical penalties on the translator).

b) As long as the translator can resist the stator's squeezing, it may be made as light as any suitable materials allow.

c) There need be no permanent physical (electrical or magnetic) connection between the stator and the translator, so there are no wires or pole pieces for example to add mass, drag, flexural forces etc.

d) The translator may move a very large distance for a very small (orthogonal) movement of the stator, which allows large output movements to be obtained from inherently low-movement prime-force mechanisms such as piezo-electric or magneto-strictive devices.

e) The loss mechanisms in the motor overall are principally the potentially very low friction between the stator and translator, and any inherent in the force-producing mechanism itself.

f) The mechanical advantage obtained can easily be made as large as desired if low-translator-force high-displacement performance is required.

g) In high-mechanical-advantage versions (very small translator taper) the maximum driven displacement of the translator is governed simply by the length of the stator.

One particularly attractive use for the linear motors of the invention is in the production of audio transducers (as in loudspeakers). When a helical conductive split or resistive non-split bender stator device (as discussed above) is used in conjunction with a low-mass low-friction linear bearing of the type disclosed hereinafter and with a very low-mass translator, there can be constructed an audio transducer where the dominant forces are those due to air drag on the translator (the mass of the translator being made comparable to the mass of the air directly moved by the movement of the translator), in which case extremely high efficiencies become possible. The helical bender stator employed in this case may be lined with a thin layer of elastic material (such as rubber) which also fills the gaps between the helical turns, providing a smooth uninterrupted surface for the bearing member to roll upon, and giving little resistance to the bending forces of the stator. By suitable geometry and material selection, the resonant frequency of the stator may be made higher than the highest audio frequency, whilst the resonant frequency of the translator in its suspension may be made very low due to the choice of minimal axial restoring forces (which are not needed at all for the basic operation of the linear motor, but only to return the translator to a known position at the start of use of the motor).

In its broadest sense, the motor of the invention could be said to comprise:

a stationary but deformable stator member having two or more opposing drive surfaces about a tubular passageway, the drive surfaces being capable of being tilted towards and away from each other approximately orthogonal to the passageway's axis, so as to vary their separation therealong; and an elongate moving translator member located within the passageway and movable therealong, and having driven surfaces corresponding to and matching and in movable near-contact with the stators' drive surfaces; wherein:

either the translator is deformable, and its driven surfaces are approximately parallel to each other in its undeformed state; or the translator is essentially rigid, and its driven surfaces are slightly barrelled;

such that when the stator is deformed so as to move the drive surfaces towards each other at one end (and away from each other at the other end) a force is applied to the driven surfaces of the translator resulting in a tendency to move the translator towards the more widely separated ends of the drive surfaces.

The features of the preferred embodiments of the linear motor of the invention may perhaps be summarised as follows:

i) There is an additional linear bearing member interposed between and in contact with the drive surfaces of the stator and the driven surfaces of the translator, and it is preferably of the type described hereinafter.

ii) The bearing member is radially deformable under pressure, and is capable of imparting an axial force to the driven surfaces of the translator when squeezed radially by the drive surfaces of the stator.

iii) The geometry of the stator, and of the translator, can be designed to provide stable, or unstable, positions of the latter within the former.

iv) The stator is a helical unimorph of piezoelectric material and metal, or a bimorph of two oppositely polarized piezoelectric materials polarized radially with respect to the helix geometry, with activating electrodes one on the inside of the helix and one on the outside, and the axial width of the helix's turns is large compared to both the turn spacing and radial thickness of the turns; and either each electrode is made of a resistive but still conductive material, and each resistive electrode at one end and on one side is connected to the resistive electrode at the other end on the other side, forming the input drive transducer electrodes, or each electrode is divided into two equal halves, one at either end of the helix, electrically isolated from each other, along a circumferential line midway along the inside axial length of the helix, and each half electrode at one end and on one side is connected to the half electrode at the other end on the other side, forming the input drive transducer electrodes;

such that when a DC drive voltage is applied between the two electrodes, one end of the helical stator increases in radius while simultaneously the other end decreases in radius.

Bearings

The motor invention described hereinbefore most preferably utilises a linear bearing of the kind now described.

Bearings come in many different guises, but in effectively every case the purpose of the bearing is to allow one body to bear upon another, and indeed to move relative thereto, without excessive energy-wasting friction between the two. Perhaps the most common sort of bearing is that used to allow one body to rotate relative to another, but there are many others, some of which allow the first body to translate—move in a line—along the surface of the second body.

One well-known variety of such a "translational"—or "linear"—bearing is the roller. A roller supports a body placed on top as it is pushed along over the undersurface (the ground, say). The present invention relates to a novel variety of roller-like translational (linear) bearing system that is specifically designed to allow two elongate bodies mounted co-axially one within the other (like sections of a telescope, or a piston within a cylinder) to be supported for friction-reduced axial movement.

The invention in its second major aspect proposes a linear bearing that incorporates some of the characteristics of a pneumatic tyre combined with those of a caterpillar track. More specifically, the invention suggests the utilisation of a resilient toroidal bearing member not unlike a pneumatic tyre inner tube; this is fitted inside and co-axially with a tubular aperture, or passageway, in one of the bearing bodies (the outer member, acting as a sleeve; it is usually the fixed body) through which aperture the other of the bearing bodies (the inner member, typically a rod or tube; it is usually the moving member) is free to slide. The inner member is then fitted through the toroid, all three components thus being co-axially aligned.

The dimensions of the toroidal bearing member are such that in use its outside (longer) perimeter is in rolling contact with the inside surface of the outer member's tubular aperture/passageway, and its inside (shorter) perimeter is in rolling contact with the inner member's outside surface. Moreover, the dimensions of the two bodies (the inner and outer members) are such that in the assembled three-component combination the tube-section of the toroid may be quite highly flattened, and may have considerable extent axially compared to its radial extent (which latter is limited by the gap between the two bodies). The resilience of the toroidal bearing member then provides a substantial radial centring force on the inner body, whilst the only restriction to axial motion is due to the deformation forces in the material of the toroid (which forces can be very small, and balance out to a large degree).

The resultant bearing can be of extremely low mass, of very low cost, and with strong radial alignment (centring) force, very low resistance to axial motion, almost unlimited movement in the axial direction.

In a second aspect, therefore, the invention provides a linear bearing suitable for use in an acoustic transducer, the bearing comprising:

a first, or outer, bearing body within which there is a linearly-extensive tubular passageway;

a second, or inner, bearing body slidably mounted within the passageway for movement along the line thereof; and a resiliently-deformable topologically-toroidal bearing member positioned between and in shape-deforming contact with the two body members such that it lies inside and around the passageway in the outer body, and outside and around the inner body, and wherein the bearing member is hollow and is filled with fluid, and rolls freely along between the two bodies. As is discussed further hereinafter, the bearing of the invention may be of particular use as part of an acoustic transducer. Thus, in a preferred aspect, the invention provides a linear bearing which is suitable for use in an acoustic transducer, and wherein:

a) the tubular passageway is internally smooth (so as to produce low noise when the bearing member rolls thereover);

b) the inner bearing body is of very low mass and externally smooth (again so as to produce low noise when the bearing member rolls thereover);

c) the bearing member is hollow, has very thin walls, is filled with gas, and is made of a low-mass, low-hysteresis material with low permeability to the filler gas; and d) the bearing member is in rolling, sealing contact with the inner and outer bearing bodies.

The invention provides a linear bearing formed of an outer bearing body within a passageway in which an inner bearing body is slidably mounted for movement therealong. Each bearing body may actually be an integral part of whatever piece of apparatus or equipment the bearing supports, but alternatively each body is a part of the bearing only, and whatever the bearing supports is separately attached to and carried by one or other body. For example, a push-rod actuator could form the inner bearing body directly, and a mirror could be mounted thereon and its position thus changed; a sliding tubular member could form the outer bearing body directly, and a print head could be mounted thereon and its position thus changed; the inner bearing body might directly form the actuating translator of an acoustic transducer, or it may have attached thereto, and so drive, the translator (the cone, or other air-moving portion, of a loudspeaker). It will normally be the case that one body is integral with, or is carrying, some part of the supported equipment which is in effect stationary, while the other body is similarly associated with some equipment part that is required in use to move. In most cases it is convenient to have the outer body part stationary, and the inner body part movable (as is so in the first example mentioned above).

The invention's bearing is a linear bearing—that is to say, its purpose is to support some object which is in use required to move along a line. As noted, one such object could be the moving part of a loudspeaker—that driving the cone or other air-moving portion while other possibilities are a printer's print head, a camera lens, and a door-opener actuator.

The bearing of the invention incorporates an outer bearing body within which there is slidably mounted an inner bearing body. These bodies can be of any material and of any dimensions appropriate to the task the bearing has to perform. For use as a door opener, for instance, the bodies should be around 2 cm in diameter, and made of light metal tubes, while for use as a print head cartridge, a rod of 1 cm diameter made of an appropriate plastic is appropriate. For a bearing needing a very low-mass moving part, such as a driver for a loudspeaker cone (or other form of audio transducer), it may be advantageous to have the inner body the moving one, and to make it hollow and from a material which is skinned-foamed material, giving a very high strength-to-mass ratio.

Within the outer body of the bearing of the invention there is a tubular passageway in which the inner body is slidably mounted for movement therealong. The passageway is tubular in the sense that it has depth and so defines a three-dimensional space (or passageway) extending into—and usually through—the outer body from one side to the other, but may have any cross-sectional shape and size, either of which may or may not be uniform along the passageway. In general, though, a suitable shape for the passageway cross-section is circular, and though a constant size cross-section is appropriate for many purposes, there are some applications where a required self-locating effect can be provided by a non-uniform section—a barrel shape, for instance, predisposes the bearing-member-supported inner body to locate centrally along the passageway, a waisted shape allows the inner body to locate at either wide end, while a conical shape encourages location at the wider end. A uniform parallel-sided tube shape provides no along-passageway position-restoring forces, and so is neutral. Clearly, by suitably shaping the passageway there may be achieved a wide range of effects; a sine wave shape would give multiple "stable" positions, rather like a stepper motor, while "dog-bone" shape would give two stable positions one at either end of the available travel. This is discussed further hereinafter.

The tubular passageway within the outer body of the bearing of the invention is a linearly-extensive one. In this context the term "linearly-extensive" means extending in a line, and it is along this line that the inner body is intended in operation to move. The line is usually a straight line, though conceivably there might be some need for the inner member to move in a curve, and therefore for the tubular passageway to be curved appropriately. The line may be, and in many applications is, relatively long compared to the cross-sectional dimensions of the passageway, so that the passageway is a deep one, but some applications—again, in certain types of loudspeaker—can with advantage employ a bearing in which the line is relatively short, and the passageway is thus relatively shallow. In either case the passageway may extend all the way through the body, being open at either end.

In the inventive bearing's outer body's passageway an inner body is slidably mounted for movement therealong. This inner body is sized and shaped to "fit" the passageway—that is, both physically to fit within the dimensions of the passageway and to match the shape of the passageway in whatever manner is required.

The physical fit is necessarily a fairly loose one, for there has to be room—an annular gap—between the two bodies for the bearing member, albeit that the bearing member when thus in place has its shape deformed by the two bodies pressing against it. The required, or acceptable, size (or relative size) of that gap depends on a number of factors, foremost of which is the nature of the bearing member, and specifically its dimensions and the material of which it is made. As is discussed further hereinafter, where the bearing member is a hollow toroid-like object the size of the gap is related to the thickness of the bearing member's walls and their practical bending radius. For approximately frictionless motion, the clearance limit is twice the thickness, but only if the material is also almost perfectly flexible. Otherwise, a clearance rather greater than twice the thickness will have to be utilised.

The bearing member is resiliently-deformable—that is to say, it can be deformed by applied forces (such as those that squeeze it between the inner and outer bodies) but springs back into its undeformed shape when those forces are removed. To achieve such deformability the bearing member may be as a hollow envelope made of flexible material and filled with another material which is itself resiliently deformable. Most conveniently, the bearing member is thus much like a tyre inner tube; a hollow body made of a flexible natural or synthetic rubber or rubber-like substance and filled with a gas (typically air) under pressure or a liquid (typically a light oil, typically a silicone oil) or perhaps a foam (which is itself essentially dispersed phase of gas captured in "bubbles", or cells within a continuous phase of some other material) or small particles of a chopped-up foam.

Use of a hollow bearing member has an effect on the practical limit to reduction in clearance between the inner and outer bodies in the region traversed by the bearing member, for the clearance is related both to the thickness of the material from which the member's hollow envelope is fabricated and to that material's practical bending radius. For approximately frictionless motion, the clearance limit is around twice the thickness, but only if the material is also almost perfectly flexible. Otherwise, a clearance of somewhat greater than twice the thickness has to be used in practice.

In a hollow toroidal bearing member of the sort just described, the material filling the inner volume of the member's envelope may be a gas; use of a gas minimizes the moving mass of the bearing. The gas may be provided as such to the inner volume, or it may be supplied in the form of a solid that subsequently undergoes some physical or chemical change to convert it to, or to generate, the desired gas. The pressure of the gas can be adjusted to provide the required radial bearing forces; the lower this pressure then in general the smaller the axial resistance to motion will be, while the greater the pressure the greater the radial load-bearing capacity. A gas being compressible, this gives the bearing a relatively high degree of radial compliance and a useful tolerance to axial tilt or misalignment. Gases can, though, easily leak from the envelope by diffusion or through pinholes, but this may be dealt with—or at least minimized—by coating the inside of the envelope with a pore-blocking liquid, such as a silicone oil.

The material filing the inner volume may, however, be a liquid; liquids are capable of supporting large pressures with little compression, and so use of a liquid provides a bearing of high radial load capacity. Of course, the mass of the moving parts of a bearing utilising a liquid-filled toroidal bearing member is increased over that using a similar gas-filled toroid, and the axial resistance to movement is also increased (due to the higher viscosity of liquids). The elasticity of the material of the member's envelope determines the dominant radial compliance of the bearing. Liquids can, though, easily leak from the envelope through pinholes.

A bearing member which is in the form of a fluid-filled envelope, as just described, may be provided with gas-inlet and -outlet means allowing control of the quantity of gas therewithin. In this way the radial force generated upon and between the two bearing bodies by the bearing member may be made to vary after assembly of the bearing, and possibly to vary in service (for example, as a function of the instantaneous loading on the bearing, or the relative position of the bodies). Provision of such gas-fill means may limit the axial travel of the bearing to approximately the length of the minor circumference of the toroid-like bearing member.

Another possibility for the material filling the inner volume of the member's envelope is a resilient and compressible solid or foamed-solid material—for example, foamed rubber or plastic particles. If a contiguous (rather than particulate) solid filling is used, this will greatly increase the axial resistance of the bearing to motion. Such solid fillings are not subject to filling-material loss from the bearing by diffusion or by leakage.

Of course, a hollow bearing member can be filled with a mixture of materials, some gas, some liquid, and some resilient and compressible solid or foamed-solid material. In particular, and because leakage of gas may be a significant problem, a liquid/vapour-phase mixture within the member's envelope may be used to maintain a relatively constant pressure therewithin even though gas/vapour leaks out, as the remaining liquid then continues to provide a relatively constant vapour pressure at a given temperature. Such a liquid/vapour phase being may be designed to compensate automatically for other temperature effects in an assembly incorporating the bearing, by providing a variable axial load bearing force as a function of temperature.

The invention's bearing member is positioned between the two body members. There is little else to say about this. The bearing member is disposed around the inner body and is squeezed between it and the walls of the tubular aperture within the outer body. It thus supports the inner body "on" the outer (or the outer "on" the inner), and the load shared between the two, and transferred from one contact surface to the other, is "absorbed" by the forces involved in the deformation (and in the internal pressure within a filled hollow bearing member).

Although the invention may have so far been described as though the invention's bearing utilised a single bearing member, in fact there may be one, two or more bearing members within a single linear bearing assembly, each such member being axially spaced apart from and coaxial with the other or others but otherwise similarly situated between the outer and inner bodies. Such a configuration may provide significantly, greater resistance to axial tilt of the inner relative to the outer body than a single bearing member of equivalent contact area, particularly if the axial spacing of the several bearing members is large compared to their axial body-contact lengths. Such an implementation is also more versatile, as each of the bearing members in the one bearing may be designed with different characteristics, including size, deformability and internal pressure (if hollow), to suit the exact nature of the loads the bearing is to carry.

The use of several different bearing members within a single bearing of the invention is particularly appropriate in cases where it is desirable that a section of the inner and outer bodies should move axially relative to each other and yet simultaneously be in very close and possibly touching contact, such as is the case in a solenoid where a short magnetic circuit is desirable. The multiple bearing member arrangement can be used together with a thickening of the relative cross-sectional profile of the inner or the outer body, or both, along those parts of the facing surfaces of the two bodies that do not come into rolling contact with the bearing members between the normal limits of travel of the linear bearing. In this way, there can be achieved inner-to-outer-body clearances smaller than may otherwise easily be accommodated.

In the invention's bearing the inner body moves within the passageway in the outer bearing body, and is slidably mounted for this movement by a bearing member. It is perhaps worth emphasising that as the bodies move relative one to the other so the bearing member "rolls" between the two, rather like a pencil rolled between thumb and forefinger. It is this rolling effect that provides the very low-friction nature of the bearing, such motion-hindering energy losses as there are being almost entirely down to the need to deform the bearing material as it rolls around, at the ends of its linear extent, from being in contact with one surface to being in contact with the other. The smaller these losses—the thinner and more flexible, say, the envelope of a hollow bearing member, and the lower its hysteresis—the smaller the apparent friction of the bearing.

The bearing of the invention provides for a range of movement limited only by the lengths of the two bodies—thus, provided only that the inner can remain mounted within the outer (the bearing member moves at half the rate—and thus half the distance—of the relative inner/outer body movement). However, unless otherwise controlled or determined there should most preferably be provided some mechanical restraints to the relative body movement, to prevent the one moving so far relative to the other that it falls off or out of the other.

The linear bearing of the invention may, perhaps, be said to comprise:

an outer bearing body (the Outer), with a tubular passageway coaxial with and in freely-rolling surface contact with a hollow, gas filled topologically-toroidal, flexible bearing member (the Toroid) itself coaxial with and in freely-rolling surface contact with an inner bearing body (the Inner), with the additional requirements that the facing surfaces of both the tubular passageway and the inner bearing body are internally smooth (so as to produce low noise when the bearing member rolls thereover), and the inner bearing body is of very low mass, and the hollow bearing member has very thin walls, is filled with gas, and is made of a low-mass, low-hysteresis material with low permeability to the filler gas, and is in sealing contact with the inner and outer bearing bodies.

It will be seen that the invention provides a linear bearing of potentially extremely low mass and very low cost, which bearing has strong radial alignment (centring) force, very low resistance to axial motion, unlimited movement in the axial direction, and either zero or precisely defined axial force/distance characteristics. The bearing includes a bearing member that has a toroidal configuration; in use the toroid rolls over the bearing surfaces around its minor circumference, which inherently causes deformation of the material of the toroid. In its simplest form, a hollow resilient (e.g. rubber) toroid is arranged to have a minor diameter substantially less than its major diameter. The dimensions of the toroid are such that when inflated its outside (longer) bounds is in rolling contact with the inside surface of the tubular passageway, and its inside (shorter) bounds is in rolling contact with the rod-like moving body, and also such that the tube-section of the toroid is quite highly flattened and has considerable extent axially (in a direction along the passageway axis) compared to its radial extent (limited by the gap between the inner body and the outer tubular sleeve). The internal pressure in the inflated toroid provides substantial radial centring force on the inner body, whilst the only restriction to axial motion is due to plastic deformation forces in the material of the toroid, and if made of thin rubber (for example) these can be very small. In this form the sliding motion is accompanied by essentially zero axial spring-like (e.g. returning) forces as all such forces are balanced. If, however, the inner body (or indeed the inside of the outer sleeve) is not parallel-sided but instead tapered, or waisted, then it can be arranged that the internal toroidal pressure provides axial forces in addition to radial bearing forces. Very fine adjustment of forces is possible, and very small force/distance relations are possible (mimicking the effect of a very long spring in a small space) by carefully designing these tapers or waists.

Embodiments of the two aspects of the invention are now described, though by way of illustration only, with reference to the accompanying diagrammatic Drawings in which:

FIGS. 1A,B show a longitudinal (axial) cross section through the linear motor in a preferred cylindrical form where the stator is first in an undriven undeformed configuration, and then in a driven deformed configuration such that the translator is being squeezed at the bottom;

FIGS. 2A,B show similarly-sectional views of an audio transducer with one or other of two different piezoelectric stators each with a translator and a toroidal linear bearing member;

FIGS. 3A,B show two similarly-sectional views of a low mass translator with a domed end cap mounted within one or other of two helical piezoelectric bender stators by a linear bearing member.

FIG. 4 shows in longitudinal (axial) sectional view a parallel-sided linear bearing assembly of the invention;

FIGS. 5A,B show in longitudinal (axial) sectional view and end view another linear bearing assembly of the invention, including an optional fluid-fill connection;

FIGS. 6A,B show variants of the assembly shown in FIG. 4 where the inner moving body has a waisted cross-sectional profile;

FIG. 7 shows a development of the assembly shown in FIG. 4 where two well-spaced toroids are used;

FIG. 8 shows a modification of the FIG. 7 embodiment with a very narrow clearance between the moving bodies;

Figure 10A:
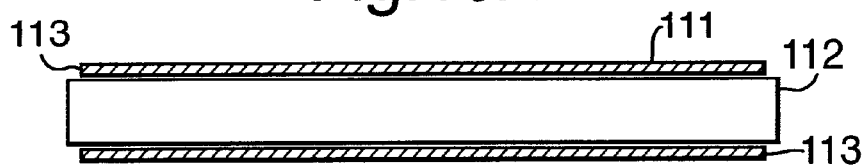
Figure 10B:
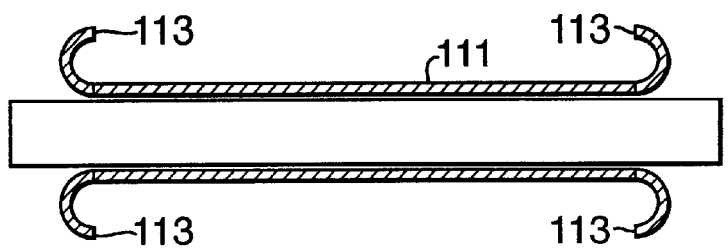
Figure 10C:
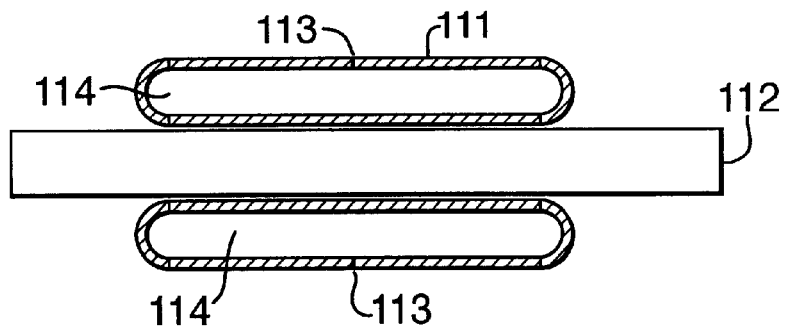
Figure 10D:
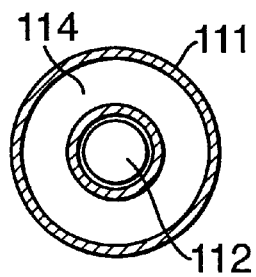

FIGS. 9A,B show two views of a different form of linear bearing assembly, wherein a relatively very large radius inner body moves only a short distance within its outer body, suitable for use as a transducer element; and FIGS. 10A–D show a "cartoon" sequence of axial-sections representing the construction of a "toroidal" bearing member for use in the bearing of the invention (FIG. 10D is a transaxial cross-section matching FIG. 10C).

Figure 1A:
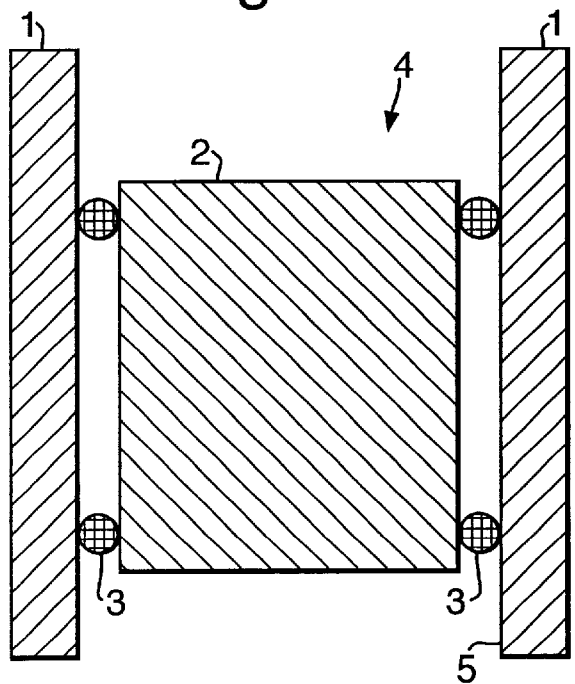
Figure 1B:
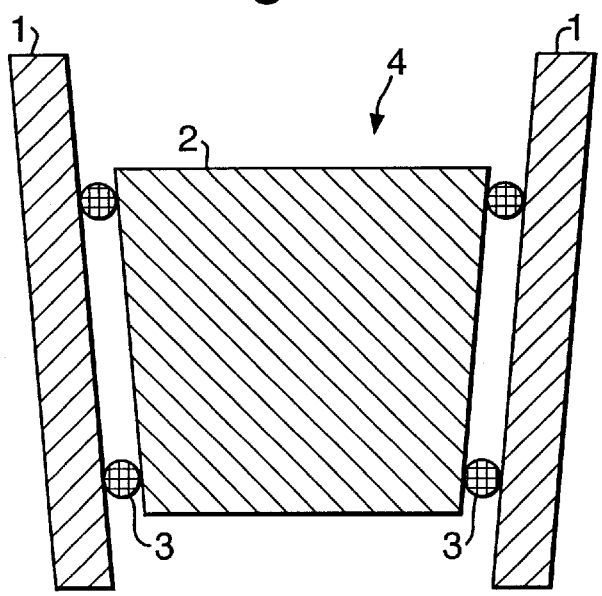

The linear motor shown in FIG. 1 comprises a stator (1) having a tubular passageway (4) in which moves axially a co-axially-aligned translator (2), sliding on a bearing device (3: shown schematically only). In FIG. 1A the stator 1 is shown in the undriven state so that its internal drive surface (5) is parallel to its axis and applies no net axial force to the translator 2. In FIG. 1B the stator 1 is shown driven in one polarity such that the upper end of the passageway 4 has expanded radially and the lower end contracted radially. In this example the bearing member 3 has transmitted the radial forces without compression of the bearing member to the translator 2, which in turn has suffered some compression due to the radial forces. There is now a net axial force directed upwards (as viewed) acting on translator 2 relative to stator 1 the effect of which is to move the translator in an upwards direction. Were the drive-signal to the stator to be reversed in polarity then the top of the stator would contract radially while the bottom would expand radially, and the forces transmitted to the translator would result in its downward motion.

Figure 2A:
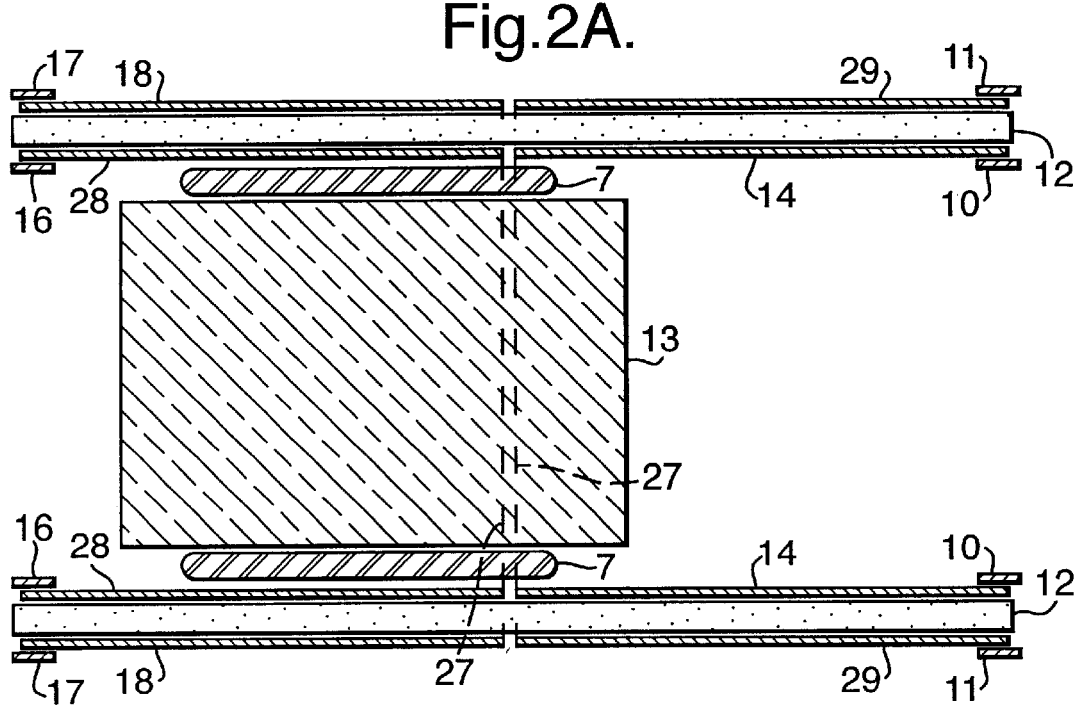

FIG. 2A illustrates, in section through the central axis, a configuration of linear motor. The motor comprises a cylindrical translator (13), supported by a linear bearing member in the form of a (possibly inflated) rolling toroid 7, which rolls within a cylindrical stator (12). Stator 12 is made of piezoelectric material so that it changes shape in response to electric fields applied by conductive electrodes (14,28 and 29,18) on its inner and its outer surface. The connections to these electrodes 14,28,29 and 18 are via conductive electrode ring terminals (10,16,11,17) at each end of the cylinder 12, these being an inner left terminal ring 16 and outer left terminal ring 17, and inner right terminal ring 10 and outer right terminal ring 11 ("left" and "right" are as viewed). In use the outer left terminal 17 is connected in parallel with the inner right terminal 10, and the inner left terminal 16 is connected in parallel with the outer right terminal 11. These input terminal pairs 17, 10 and 16,11 are then each connected to one of the two output terminals of the electrical driving supply (not shown). As the electrodes 14,28,29,18 are conductive, when a voltage is applied between the terminals as described a voltage gradient is set up between the outside and the inside surfaces of the cylinder, with the direction of gradient in one half of the cylinder opposite to that in the other half. With the connections as described, this results in a deflection voltage (equal to the supply voltage) of one polarity between the inside and outside of the cylinder 12 at one end, and an equal deflection voltage of opposite polarity between the inside and outside at the opposite end of cylinder 12. The net effect is to cause maximum piezoelectric deformation of the cylinder at the ends (but with opposite polarity) and minimum such deformation at the centre of the cylinder, in consequence of which, the cylinder deforms into a roughly truncated conical shape, wider at one end than the other. Reversal of the polarity of the supply voltage interchanges the wider and narrower ends. In this way the cylinder 12 may be driven in such a way as to cause the translator 13 to move up and down the cylinder by virtue of the compression and deformation of the toroidal bearing member 7.

Figure 2B:
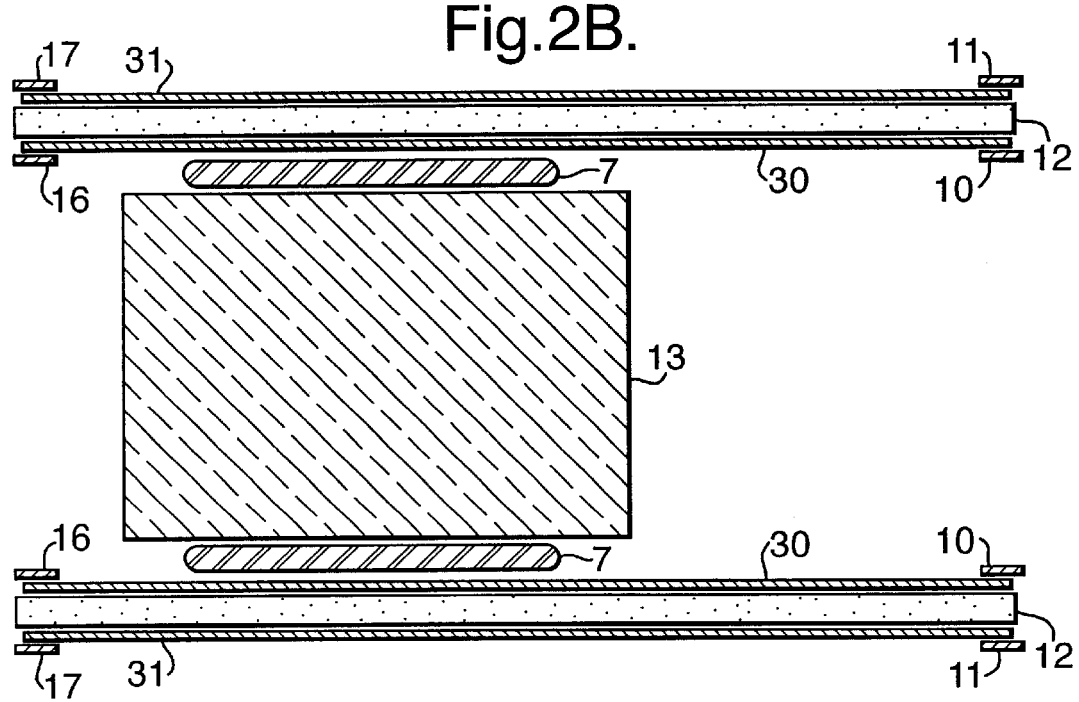

FIG. 2B illustrates, in section through the central axis, a similar configuration of the linear motor to that shown in FIG. 2A, but with a different electrode configuration. Stator 12 is again made of piezoelectric material so that it changes shape in response to electric fields applied in this case by uniform resistive electrodes 30 on its inner surface and 31 on its outer surface. The connections to these restive electrodes 30,31 are via a pair of conductive electrode ring terminals at each end of the cylinder 12—inner and outer left terminal rings 16,17 and inner and outer right terminal rings 10,11. In use, the outer left terminal 17 is connected in parallel with the inner right terminal 10, and the inner left terminal 16 is connected in parallel with the outer right terminal 11. These input terminal pairs 17,10 and 16,11 are then each connected to one of the two output terminals of the electrical driving supply (not shown). As the electrodes 30,31 are uniformly resistive, when a voltage is applied between the ends of the electrodes as described a uniform voltage gradient is set up along the outside and the inside surfaces of the cylinder, with the direction of gradient on the inside opposite to that on the outside. With the connections as described, this results in a maximum voltage (equal to the supply voltage) of one polarity between the inside and outside of the cylinder 12 at one end, falling uniformly towards zero voltage between the inside and outside of the cylinder along a circumferential line along the middle of the cylinder, and then rising again to a maximum voltage of opposite polarity between the inside and outside at the opposite end of cylinder 12. The net effect is to cause maximum piezoelectric deformation of the cylinder at the ends (but with opposite polarity) and minimum such deformation at the centre of the cylinder, in consequence of which, the cylinder deforms into a truncated conical shape, wider at one end than the other. Reversal of the polarity of the supply voltage interchanges the wider and narrower ends. In this way the cylinder 12 may be driven in such a way as to cause the translator 13 to move along the cylinder by virtue of the compression and deformation of the toroidal bearing member 7.

An alternative electrode arrangement is also possible for the system shown in FIG. 2B: one or other (but not both) of the electrodes 30,31 may be made of conductive rather than resistive material; in this case a push-pull drive voltage is required, with the common of the drive supply connected to the end terminal(s) of the conductive electrode (e.g.10 & 16 if 30 is conductive, or 11 & 17 if 31 is conductive), and the two antiphase outputs of the drive supply connected to the remaining terminals of the resistive electrode (11 & 17, or 10 & 16, respectively). This arrangement still results in a voltage gradient across the inner to outer electrodes that varies smoothly and uniformly from a maximum at one end of the cylinder to zero at the middle and to a maximum of opposite polarity at the other end, resulting in a similar truncated-conical deformation of the cylinder.

In FIG. 3A a low mass translator 6 of cylindrical section and with a domed end cap is shown outlined by the dotted line. This translator is located co-axially within the stator 8 of a helical piezoelectric bender (this may be either a unimorph or a bimorph device), and is separated from it by a linear bearing 7 of the rolling type described herein providing very low friction with good axial alignment, and transmitting the radial forces of the helical stator 8 and converting them into axial forces by virtue of its deformation under pressure. In practice translator 6 may be given a very slightly waisted profile instead of being absolutely parallel along the axial direction, to provide a slight static centring force to the Translator. The conductive electrodes (24,25) on the inside of the stator 8, and (22,23) on the outside are mechanically and electrically discontinuous (at 26), the break being sited along the stator's central circumference to allow the top and bottom sections to be connected in antiphase with each other. In operation, the upper outside electrode 22 is connected to the lower inside electrode 25, and the upper inside electrode 24 is connected to the lower outside electrode 23. A DC electrical signal applied between the pairs of electrodes 22,25, and 24,23 of the helical stator will cause one end to expand radially while the other contracts radially. Reversal of the DC signal will cause the end that previously expanded to contract, and vice versa.

In FIG. 3B there is shown a helical bender motor similar to that described above and shown in FIG. 3A but modified by the replacement of the two pairs of split electrodes 22,23, and 24,25 by a single pair of resistive electrodes (20,21)—much as the cylindrical motor design of FIG. 2B was a modification of the cylindrical motor of FIG. 2A. A pair of conductive ring electrodes are added at each end of the cylindrical outline of the helix, inside (28) at the bottom and (29) at the top, and outside (27) at the bottom and (30) at the top. These are electrically connected together in pairs, 28 to 30, and 29 to 27. Finally, the pairs are used as input terminals to connect to the driving power supply, i.e. 28 and 30 to one power supply output terminal and 29 and 27 to the other power supply terminal (not shown). This results in voltage gradients along the length of the inside and outside of the helix in opposite directions, giving a maximum positive deflection potential at one end of the helix, smoothly varying to zero at the centre of the helix, and rising to a maximum negative potential at the opposite end of the helix. This in turn results in the cylindrical helical outline deforming almost perfectly into a truncated conical shape.

Figure 4:
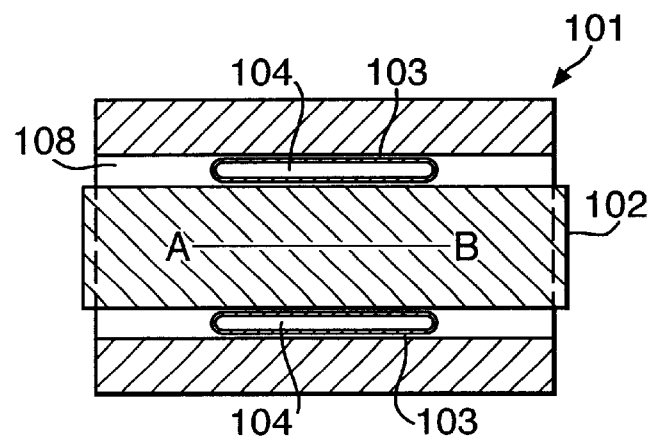

FIG. 4 shows a parallel-sided linear bearing assembly of the invention. The bearing comprises an outer body (101) having a tubular passageway (108) in which moves axially a co-axially-aligned inner body (102) separated from body 101 by a flexible hollow toroidal bearing member (103) which in this Figure is seen highly flattened. The toroid 103 is coaxial with the inner and outer bodies 101 and 102, surrounding the inner body 102 and in turn surrounded by the outer body 101. The internal volume (104) of toroid 103 is filled with fluid.

The sizes of the inner and outer bodies 101,102 and the toroid 103 are such that the toroid 103 is held in close contact with the bodies 101,102, so that when the inner body 102 moves axially in the direction indicated by the double ended arrow A<—>B then the surface of the toroid 103 rolls on the inner surface of the outer body 101 and on the outer surface of the inner body 102—which, being a rolling action, does not involve sliding friction. Static friction prevents relative motion between the mating surfaces of the outer body 101 and the toroid 103, and of the toroid 103 and the inner body 102, but no frictional losses are involved through this mechanism during axial relative motion of the bodies 101,102. The internal pressure in the toroid 103 may be adjusted at assembly time to provide the required radial bearing forces between the bodies 101,102 without any significant impact on the motional friction of the bearing. The dominant resistance to motion is due to the flexural resistance of the material of which the toroid 103 is made, and this may be made arbitrarily low by use of suitably thin material for the toroid 103 and by choice of that material.

If the toroid 103 is not bonded to either of the bodies 101,102 then there is in principle no limit to the extent of relative axial motion between the bodies 101,102 other than the dimensions of the bodies 101,102 in the A<—>B direction.

Figure 5A:
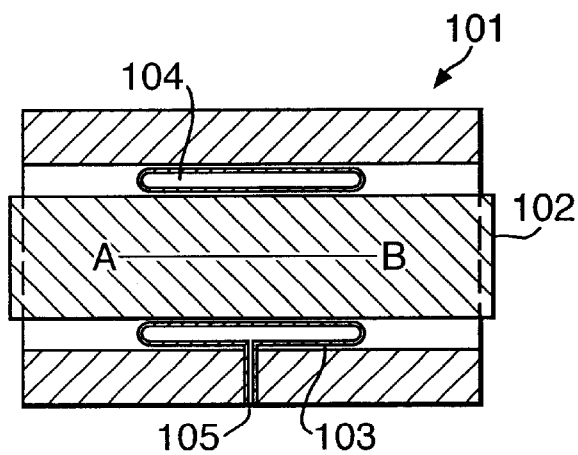
Figure 5B:
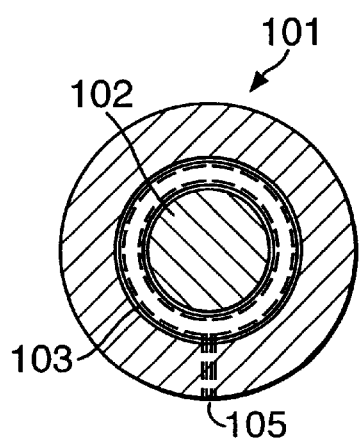

In the FIG. 5 embodiment the toroid 103 is provided with a fluid-fill connection (105) inserted through the wall of the outer body 101, so that the internal pressure in the volume 104 within the toroid 103 may be adjusted after assembly of the bearing. This allows for the dynamic alteration of the bearing characteristics, as well as the topping-up of the toroid 103 with pressurising fluid should leakage occur.

Figure 6A:
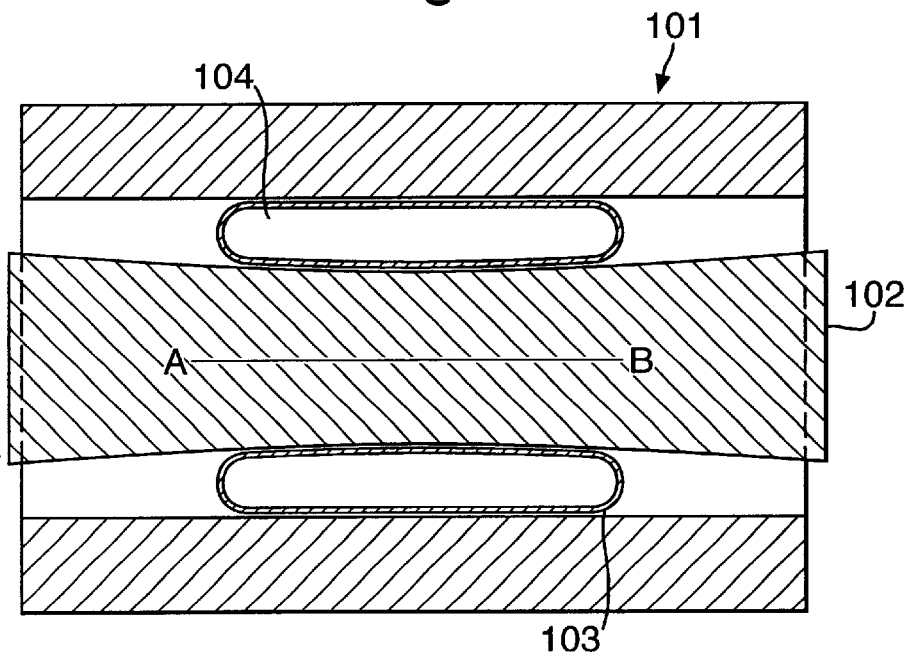

Because the inner cross-sectional (i.e. orthogonal to the axis) profile of the outer body 101 and the outer profile of the inner body 102 in FIG. 4 are independent of position in the A<—>B direction, the volume of the toroid 103 is unchanged as the bodies 101,102 move axially relatively to each other. Thus, any internal-pressure-induced forces are balanced, and there is no spring force associated with such a linear bearing, i.e. no static force as a result of a particular axial relative position of the bodies 101,102. However, if instead the profile of the outer body 101 or the inner body 102 (or both) is/are made to vary with position then a linear bearing with built-in axial force characteristic is made possible. FIGS. 6A,B show linear bearings with the inner body 102 provided with a profile tapering towards the centre, as an example of this technique for producing an axial force/distance relationship.

In these examples the toroid 103 has maximum volume when the inner body 102 is centred axially on member 103, in the axial location shown. Should the inner body 102 move axially away from this position whilst rolling on the toroid 103, the profile of the inner body 102 is such as to further compress the toroid 103—and the nett effect of this is to produce an axial thrust on the inner body 102 tending to restore it to the original central axial location. The particular axial change of cross-sectional profile in the example is circular, with a radius much greater than the length of the inner body 102. Decreasing the profile-change radius (i.e. making the inner body 102 more 'waisted') produces a stronger restoring force for a given displacement of the inner body 102 from central position. Increasing the profile-change radius decreases the restoring force, and in the limit, when the profile radius is infinite, i.e. the inner body 102 has parallel sides, then the restoring force is zero and independent of relative axial location of the inner body 102.

Figure 6B:
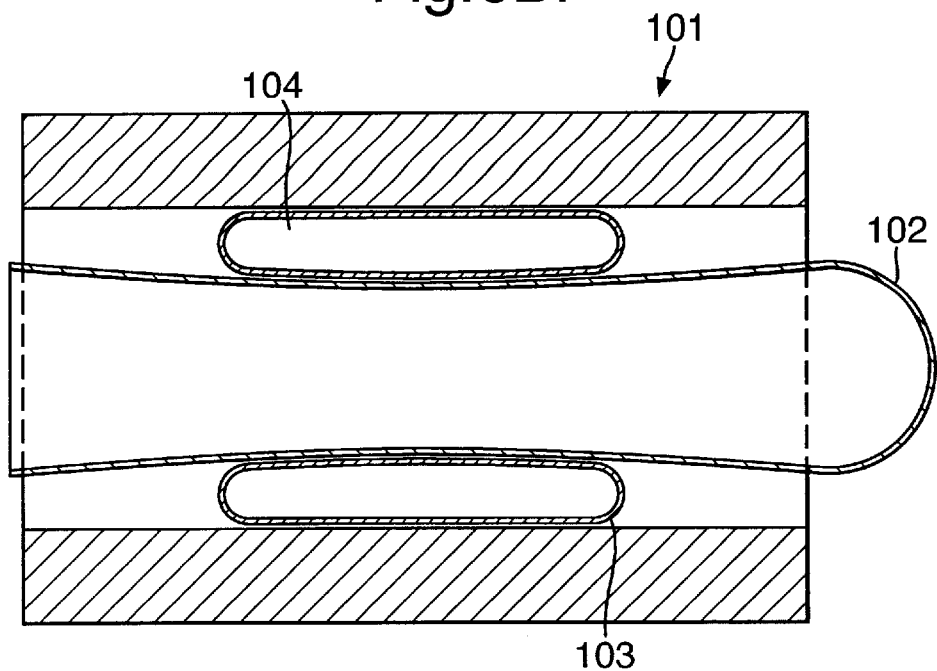

A particular application making use of the unique properties of this linear bearing is shown in FIG. 6B. Here, the inner body 102 has been implemented as a thin shell for maximum lightness for a given mass. The waisted taper of the outer profile of the inner body 102 provides a small centralising force which will return the body to a fixed position in the absence of other forces. One end of the inner body 102 is closed off with a hemispherical shell.

If the outer body 101 is made to form part of (say) an electromagnetic motor unit, and a magnetic pole piece is fitted inside the inner (hollow) bore of the inner body 102, then the assembly forms a very long-throw motor-driven piston with the inner body 102 playing the role of the piston. As the moving mass is essentially that of the shell, the inner body 102 plus any electromagnetic component(s) (e.g. a coil winding), and the suspension system adds very little mass if the toroid 103 is made of thin elastomer and is gas-filled, and as the restoring force may be made as small as desired whilst a very long throw is possible with this linear bearing suspension, using such a bearing arrangement there may be constructed an acoustic transducer with significant power output at low frequencies (due to its very long throw relative to piston diameter) but which is also light enough to operate at much higher frequencies too.

Where greater resistance to axial tilt is required from a toroidal bearing of a given length than it can sustain at a given internal pressure, more than one toroid may be used in the same bearing. An example showing the use of two toroids in one linear bearing is illustrated in FIG. 7, showing the use of two separate toroids (103,106). The greater the separation between the toroids 103 and 106 then the greater the axial tilt resistance of the bearing, all other parameters being equal. Such an implementation is more versatile than a bearing comprising just one toroid of length comparable with the separation of the two (or more) separate toroids, since, for example, the separate toroids may be given different properties (e.g. one could be stiffer than the other, have a different external diameter, or have a different internal pressure). This flexibility allows a linear bearing to be tailored very closely to the optimum form for any given application.

FIG. 8 illustrates a means of providing for very small gaps between the moving bodies 101,102 by using the double-toroid suspension system already described, and by thickening the outer body 101 (as shown at 107); here, the clearance between the bodies 101,102 may be made as small as desired, because the axial region around 107 is not needed for the travel of either of the toroids 103,106 which roll between the bodies 101,102 in the axial regions either side of 107 only, within the normal range of travel required. A similar effect may be had by thickening the inner body 102 instead of the outer body 101 around the region indicated at 107, or, indeed, by thickening both the bodies 101,102.

The assembly shown in FIG. 9 is one wherein a relatively very large radius inner body (102) made of a very light material moves only a short distance within its outer body (101). The inner body is slightly waisted to provide a slight restoring force. Such an assembly is suitable for use as an audio transducer; the inner body is itself the transducer element, and when activated (by means not shown) by suitable electrical signals its resulting motion along the outer body pushes the surrounding air back and forth to create sound waves.

FIGS. 10A–C show a "cartoon" sequence representing the construction of a "toroidal" bearing member for use in the bearing of the invention. A tube (111: shown positioned on a rod 112 for support, in FIG. 10A) is rolled back along itself, inside out (FIG. 10B), and then joined together at its ends (113), resulting in a closed volume (114), as can be seen from FIG. 10C (and FIG. 10D). This type of construction easily makes a "toroid" of which the major diameter is not significantly larger than the minor diameter. The material making the formed "toroidal" bearing member has no preferred orientation relative to the "toroid", so the bearing member rolls freely.

What is claimed is:

1. A linear bearing comprising:

a first, or outer, bearing body within which there is a linearly-extensive tubular passageway;

a second, or inner, bearing body slidably mounted within the passageway for movement along the line thereof; and a resiliently-deformable topologically-toroidal bearing member which is positioned between and in shape-deforming contact with the two body members such that it lies inside and around the passageway in the outer body, and outside and around the inner body and which is hollow and is filled with fluid and, in use, rolls freely along between the two bodies.

2. A bearing according to claim 1, wherein the tubular passageway is circular in cross-sectional shape.

3. A bearing according to claim 1, wherein the passageway is either of a constant size cross-section or is of a barrel or a waisted shape.

4. A bearing according to claim 1, wherein the passageway extends in a straight line.

5. A bearing according to claim 1, wherein the inner body is circular in cross-section.

6. A bearing according to claim 1, wherein the inner body is either of a constant size cross-section or is barrel-shaped, waisted, or conical.

7. A bearing according to claim 1, wherein said bearing member has the shape and form achieved either by taking a tube and bending it round in a circle to join its ends together or by taking a tube and rolling it back along itself, inside out, and then joining its ends together.

8. A bearing according to claim 1 which bearing utilizes more than a single bearing member, each such member being axially spaced apart from and coaxial with the other or others.

9. A bearing according to claim 1, wherein there are provided mechanical restraints, or end stops, to the relative body movement.

10. A bearing according to claim 1, which bearing is suitable for use in an acoustic transducer, and wherein:

a) the tubular passageway is internally smooth so as to produce low noise when the bearing member rolls thereover;

b) the inner bearing body is of very low mass and externally smooth, again so as to produce low noise when the bearing member rolls thereover;

c) the bearing member has very thin walls and is made of a low-mass, low-hysteresis material with low permeability to the filler gas; and d) the bearing member is in rolling, sealing contact with the inner and outer bearing bodies.

11. An acoustic transducer constructed having a bearing according to claim 1 supporting within its stator the translator driving an air-moving device.

* * * * *